United States Patent
Patodia

(10) Patent No.: US 12,530,246 B2
(45) Date of Patent: Jan. 20, 2026

(54) MANAGING DATA DEPENDENCIES IN AN N-LAYER ARCHITECTURE FOR DATA LOADING OPTIMIZATIONS

(71) Applicant: PAYPAL, INC., San Jose, CA (US)

(72) Inventor: Prabin Patodia, Bangalore (IN)

(73) Assignee: PAYPAL, INC., San Jose, CA (US)

( * ) Notice: Subject to any disclaimer, the term of this patent is extended or adjusted under 35 U.S.C. 154(b) by 575 days.

(21) Appl. No.: 17/985,701

(22) Filed: Nov. 11, 2022

(65) Prior Publication Data
US 2024/0160503 A1    May 16, 2024

(51) Int. Cl.
*G06F 9/54*        (2006.01)
*G06N 5/022*    (2023.01)

(52) U.S. Cl.
CPC .............. *G06F 9/542* (2013.01); *G06N 5/022* (2013.01)

(58) Field of Classification Search
CPC ....................................................... G06F 9/541
See application file for complete search history.

(56) References Cited

U.S. PATENT DOCUMENTS 11,847,100 B2 * 12/2023 Hsu ...................... G06F 16/183

\* cited by examiner

*Primary Examiner* — Andy Ho
(74) *Attorney, Agent, or Firm* — Haynes and Boone, LLP (70481)

(57) ABSTRACT

There are provided systems and methods for managing data dependencies in an N-layer architecture for data loading optimizations. A service provider, such as an electronic transaction processor for digital transactions, may utilize different decision services that implement rules and/or artificial intelligence models for decision-making of data including data in production computing environment. Decision services may be used for data processing and decision-making, where multiple decision services may be invoked during run-time in order to complete a data processing request. When processing data, data loads may be required by decision services, where multiple data loads that are the same or similar may be utilized by different data services. Thus, the service provider may provide data loading optimization by making these data loads available across multiple decision services. This may be done based on an intelligent and/or algorithmic process based on data storage requirements.

20 Claims, 5 Drawing Sheets

MANAGING DATA DEPENDENCIES IN AN N-LAYER ARCHITECTURE FOR DATA LOADING OPTIMIZATIONS

TECHNICAL FIELD

The present application generally relates to data loading between different microservices, and more particularly to providing streamlined and updated application programming interface (API) specifications based on data dependencies during data loading.

BACKGROUND

Online service providers may offer various services to end users, merchants, and other entities. This may include providing electronic transaction processing data flows, services, and other computing resources. Further, the service provider may provide and/or facilitate the use of online merchant marketplaces and/or transaction processing between different entities. When providing these computing services, the service provider may utilize decision services, which may correspond to micro-computing services having rules-based and/or machine learning (ML)-based engines, computing nodes, execution paths, and the like to process data requests and loads for different outputs (e.g., authentication, risk or fraud analysis, electronic transaction processing, etc.). On receiving a request, a decision service may begin executing a set of tasks based on loaded data from a database or other resource. Each of these data loads may take time and require computing resources. When the same or similar data is repeatedly loaded during a task or other data processing of a request by different computing services and corresponding APIs, computing systems may receive increased data loading and processing requests, which unnecessarily burdens computing systems. As such, it is desirable to determine data dependencies in a multiple layer (e.g., N-layer) computing architectures to minimize data loads in application programming interface (API) specifications.

Figure 1:
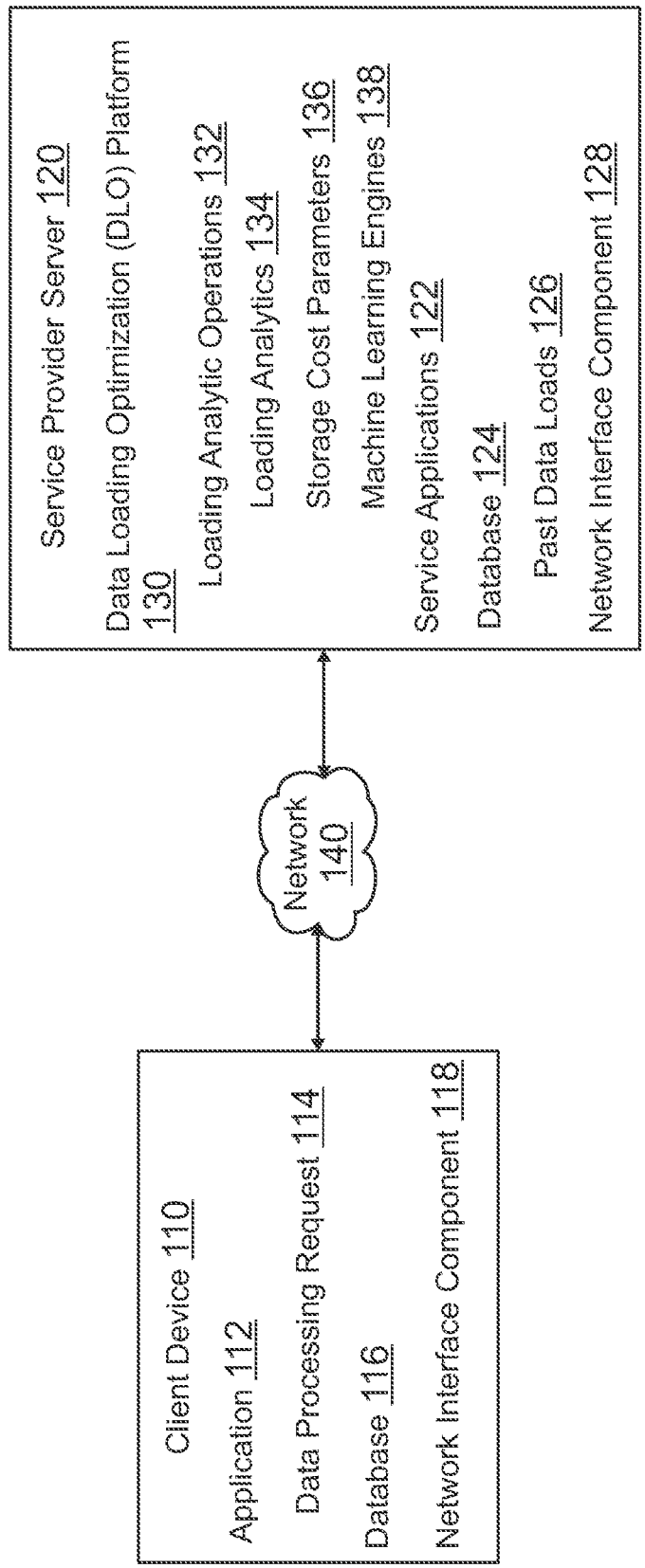
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for managing data dependencies in an N-layer architecture for data loading optimizations. Systems suitable for practicing methods of the present disclosure are also provided.

A service provider may provide different computing resources and services to users through different websites, resident applications (e.g., which may reside locally on a computing device), and/or other online platforms. When utilizing the services of a particular service provider, the service provider may provide decision services for implementing rules and intelligent (e.g., machine learning (MIL) or other artificial intelligence (AI)-based) decision-making operations with such services. For example, an online transaction processor may provide services associated with electronic transaction processing, including account services, user authentication and verification, digital payments, risk analysis and compliance, and the like. These decision services may be used to determine if, when, and how a particular service may be provided to users. For example, risk rules may be utilized with a risk engine for a decision service to determine if an indication of fraud is present in a digital transaction and payment, and therefore to determine whether to proceed with processing the transaction or decline the transaction (as well as additional operations, such as request further authentication and/or information for better risk analysis). Decision services typically automate repeatable decisions based on decision modeling capabilities so that computing services may execute and perform operations requested by a user's computing device.

For example, a user may utilize online service providers, such as transaction processors, via their available online and networked digital platforms. The user may make a payment to another user or otherwise transfer funds using the online platforms of the service providers. In this regard, a user may wish to process a transaction, such as for a payment to another user or a transfer. A user may pay for one or more transactions using a digital wallet or other account with an online service provider or transaction processor (e.g., PayPal®). An account may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. The account and/or digital wallet may be loaded with funds or funds may otherwise be added to the account or digital wallet. The application or website of the service provider, such as PayPal® or other online payment provider, may provide payments and the other transaction processing services via the account and/or digital wallet.

The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and other transaction processing services. In further embodiments, the service provider and/or other service providers may also provide additional computing services, including social networking, microblogging, media sharing, messaging, business and consumer platforms, etc. These computing services may be deployed across multiple different websites and applications for different operating systems and/or device types. Furthermore, these computing services may utilize the aforementioned decision services when determining decisions during data processing. For example, access and use of these accounts may be performed in conjunction with the aforementioned decision services.

The user may utilize the account and/or other computing services provided by the service provider via one or more computing devices, such as a personal computer, tablet computer, mobile smart phone, or the like, and may engage in one or more transactions with a recipient, such as a recipient account or digital wallet that may receive an amount of a payment. When engaging in these interactions, the service provider may utilize the corresponding decision services to process data requests and loads and provide a decision or other output. In this regard, a decision service may include different data processing nodes or services (e.g., sub-services that are invoked by the main decision service), where each data processing node may include executable instructions to perform one or more computing tasks that process data from a data processing request and output a response. For example, computing tasks may correspond to executable code, operations, and/or models that may include a client device request processor, a compute for business rules, a data loader, a validation of a data load of the data processing request, a user authenticator, or a response builder for a decision by the decision service, although other tasks may also be used. In this regard, a decision service may include computing tasks that obtain an intended result based on a provided data load for a data processing request. The nodes or services for these computing tasks may be configured to be executed in a desired linked fashion, such as serial, parallel, etc., in one or more execution flows having the processing or execution pathways including the computing tasks. Thus, each of these tasks are connected to form different execution paths that may result in the corresponding decision or output by the decision service. Thereafter, a decision may be output by a decision service based on the responses to each task being executed for the corresponding decision.

These computing tasks may be executed in an order and/or processing flow according to a directed acyclic graph (DAG) or another directed graph or ordering of the computing tasks for execution by the decision service. For example, a DAG or other graph may correspond to a flow between computing tasks that causes output of a decision. Computing tasks may be arranged in an order within a DAG depending on the decision service and/or data processing request, for example, so that certain computing tasks may execute and provide data for processing by later computing tasks. A data processing request may be a request from a client computing device, such as an end user or customer of the service provider system, which may request use of a computing service and provide a data load for processing. For example, a data processing request may be associated with a particular request for use of a service for account login, authentication, electronic transaction processing, risk or fraud, and other ones of the aforementioned computing services. The directed graph may therefore correspond to the execution flow and show the different execution paths for executing the computing tasks in series, parallel, or the like. This may include having nodes for computing tasks connected by edges to show the various paths (e.g., in series, parallel, start, end, etc.) for the execution flow of the decision service.

In some environments and/or conditions, multiple decision services may utilize the same data load, such as an account balance, account login name, contact identifier, user input for the data request, profile or transaction history, or the like. A computing architecture may function to have multiple or N-layers that utilize outputs from a previous micro or decision service with the same or similar loaded data to make decisions and provide outputs. For example, an N-layer architecture may have different nodes and different flows via an execution graph that utilizes different decisions services, which may require the same, similar, or different data loads for data processing. Thus, when previously loaded data is reused, additional computing resources are consumed and utilized by such different decision services in the computing architecture.

Thus, in an N-layer architecture may have multiple services for computation calls to the same or similar downstream services for specific requirements or the same or similar data and data loading calls/requirements. When there are multiple calls for the same intent and for the same transaction or other data, this not only increases the overall time for the end-to-end computation but also makes the architecture ineffective. In this regard, an intelligent data processor may be utilized in order to identify and analyze the cost impact for such use-cases and same or similar data loading requirements. This compute process may intelligently identify a correct and/or properly timed and positioned call position for a chain of flow of the data and the data loading required, which allows the intelligent data processor to modify the related flow path API specification to assist in propagating the required data until each layer, as needed, receives the loaded data without requiring multiple data calls and loads. This thereby avoids multiple calls to the same downstream service for data and does not require duplicate data loads when unnecessary.

An intelligent execution manager of the service provider may execute one or more intelligent data processes that may reduce overall system load, optimize the end-to-end execution time of the computing architecture, and automatically identify and enhance API specifications in a valid and reliable end-to-end operation in an N-layer architecture. For example, for a first decision service, there may be a gateway where a "balance" is required. Thereafter, there may be a compliance decision service needing a "profile, transaction history, and CIP details", and further a risk decision service needing a "balance, and transaction history". The intelligent data process(es) may be used to run computations on data call related statistics over a period of time to determine if optimizations may be made and data may be stored/saved in a proactive manner to allow for further decision services to utilize such data in the future during processing of a data load and/or request. This manager and processor may further decide if a modification to an API specification may optimize the overall system and perform the modification if needed to the API specification.

For example, an intelligent data processor and execution manager may perform certain checks on a data load during runtime and/or after for data processing requests utilizing decision services. These checks may include a computation on benefits from the collected statistics, and, if beneficial, fetch the API specifications and create a data specification for available data that modifies the API specification accordingly for the first decision service until the last service in the data processing flow. The processor may then push the modified API specification(s) to the specification repository (ies) to be next consumed and executed by the corresponding decision services. The processor may then update the specification owners regarding the changes made to their APIs so that those owners are aware of the corresponding automatically performed changes. Thereafter, the manager and process may continue analyzing and making changes to accommodate any new decision service additions or call changes that may have API change requirements in the N-layer architecture to maintain an optimal data dependency and data load performance. A formula and/or optimization strategy may provide balancing as to whether a data load should be stored and saved for other decision services. For example, if the time taken for processing a request by a first data process service is 50 ms for the same data load and if a total of 150 ms is required and/or consumed with two or more a secondary data loads, 100 ms may be saved by having the data propagate from the first caller (e.g., Gateway) to the last caller (e.g., computation service-X that is in a downflow of the execution flow for processing a data processing request).

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a client device 110 and a service provider server 120 in communication over a network 140. Client device 110 may be utilized by a user to access a computing service or resource provided by service provider server 120, where service provider server 120 may provide various data, operations, and other functions to client device 110 via network 140. These computing services may utilize decision services for decision-making during data processing. In this regard, client device 110 may be used to access a website, application, or other platform that provides computing services. Service provider server 120 may provide computing services that process data and provide decisions in response to data processing requests via decision services, where the decision services may be optimized to provide faster and more coordinated data processing by preloading, caching, and/or making data loads available across multiple decision services.

Client device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Client device 110 may be implemented as a communication device that may utilize appropriate hardware and software configured for wired and/or wireless communication with service provider server 120. For example, in one embodiment, client device 110 may be implemented as a personal computer (PC), a smart phone, laptop/tablet computer, wristwatch with appropriate computer hardware resources, eyeglasses with appropriate computer hardware (e.g., GOOGLE GLASS® and/or other headsets including metaverse configured headsets), other type of wearable computing device, implantable communication devices, and/or other types of computing devices capable of transmitting and/or receiving data. Although only one device is shown, a plurality of devices may function similarly and/or be connected to provide the functionalities described herein.

Client device 110 of FIG. 1 contains an application 112, a database 116, and a network interface component 118. Application 112 may correspond to executable processes, procedures, and/or applications with associated hardware. In other embodiments, client device 110 may include additional or different modules having specialized hardware and/or software as required.

Application 112 may correspond to one or more processes to execute software modules and associated components of client device 110 to provide features, services, and other operations for a user over network 140, which may include accessing and utilizing computing services provided by service provider server 120. In this regard, application 112 may correspond to specialized software utilized by a user of client device 110 that may be used to access a website or application (e.g., mobile application, rich Internet application, or resident software application) that may display one or more user interfaces that allow for interaction with the computing services of service provider server 120. In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 140, including retrieving website information, presenting the website information to the user, and/or communicating information to the website. However, in other embodiments, application 112 may include a dedicated application of service provider server 120 or other entity.

Application 112 may be associated with account information, user financial information, and/or transaction histories. However, in further embodiments, different services may be provided via application 112, including social networking, media posting or sharing, microblogging, data browsing and searching, online shopping, and other services available through service provider server 120. Thus, application 112 may also correspond to different service applications and the like. When utilizing application 112 with service provider server 120, application 112 may request processing of a data processing request 114, such as by providing a data load for data processing request 114 or other data, data endpoints or resources, identifiers, and the like when utilizing one or more computing services of service provider server 120. Data processing request 114 may correspond to account login, authentication, electronic transaction processing, and/or use of other services described herein. Data processing request 114 may have a corresponding data load that is processed via one or more decision services of service provider server 120 to provide a decision that is used to provide a resulting output and result. As such, application 112 may be used with the decision services of service provider server 120, which may utilize the data load with multiple decision services from a cache or other data store in response to data processing request 114.

In various embodiments, client device 110 includes other applications as may be desired in particular embodiments to provide features to client device 110. For example, the other applications may include security applications for implementing client-side security features, programmatic client applications for interfacing with appropriate application programming interfaces (APIs) over network 140, or other types of applications. The other applications may also include email, texting, voice and IM applications that allow a user to send and receive emails, calls, texts, and other notifications through network 140. In various embodiments, the other applications may include financial applications, such as banking applications. Other applications may include social networking applications, media viewing, and/or merchant applications.

The other applications may also include other location detection applications, which may be used to determine a location for the user, such as a mapping, compass, and/or GPS application, which can include a specialized GPS receiver that determines location information for client device 110. The other applications may include device interface applications and other display modules that may receive input from the user and/or output information to the user. For example, the other applications may contain software programs, executable by a processor, including a graphical user interface (GUI) configured to provide an interface to the user. The other applications may therefore use devices of client device 110, such as display devices capable of displaying information to users and other output devices, including speakers.

Client device 110 may further include database 116 stored on a transitory and/or non-transitory memory of client device 110, which may store various applications and data and be utilized during execution of various modules of client device 110. Database 116 may include, for example, identifiers such as operating system registry entries, cookies associated with application 112 and/or the other applications, identifiers associated with hardware of client device 110, or other appropriate identifiers, such as identifiers used for payment/user/device authentication or identification, which may be communicated as identifying the user/client device 110 to service provider server 120. Moreover, database 116 may include data used for data processing request 114, such as data that may be provided as a data load processed by service provider server 120.

Client device 110 includes at least one network interface component 118 adapted to communicate with service provider server 120 and/or other devices and servers over network 140. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide computing services that utilize decision services for decision-making in an intelligent system to provide responses, output, and/or results to client device 110 based on data processing requests. In this regard, service provider server 120 includes one or more processing applications which may be configured to interact with client device 110. For example, service provider server 120 may deploy decision services that include intelligent execution managers in order to determine whether to store a data load utilized by multiple decision services during processing of the data processing requests. In one example, service provider server 120 may be provided by PAYPAL®, Inc. of San Jose, CA, USA. However, in other embodiments, service provider server 120 may be maintained by or include another type of service provider.

Service provider server 120 of FIG. 1 includes a data loading optimization (DLO) platform 130, service applications 122, a database 124, and a network interface component 128. DLO platform 130 may correspond to executable processes, procedures, and/or applications with associated hardware. In other embodiments, service provider server 120 may include additional or different modules having specialized hardware and/or software as required.

DLO platform 130 may correspond to one or more processes to execute modules and associated specialized hardware of service provider server 120 to provide computing services for account usage, digital electronic communications, electronic transaction processing, and the like. In this regard, DLO platform 130 may correspond to specialized hardware and/or software used by a user associated with client device 110 to utilize one or more computing services through service applications 122, which in turn utilize decision services corresponding to computing microservices for decision-making during runtime. Service applications 122 may include and/or utilize various applications, such as those that may correspond to electronic transaction processing, payment accounts, payment messaging, and the like, as well as other computing operations as further discussed herein. For example, service applications 122 may include social networking, media posting or sharing, microblogging, data browsing and searching, online shopping, and other services available through service provider server 120. Service applications 122 may be used by a user to establish an account and/or digital wallet, which may be accessible through one or more user interfaces, as well as view data and otherwise interact with the computing services of service provider server 120. In various embodiments, financial information may be stored to the account, such as account/card numbers and information. A digital token or other account for the account/wallet may be used to send and process payments, for example, through an interface provided by service provider server 120. The payment account may be accessed and/or used through a browser application and/or dedicated payment application, which may provide user interfaces for access and use of the computing services of DLO platform 130.

The computing services may be accessed and/or used through a browser application and/or dedicated payment application executed by client device 110, such as application 112 that displays UIs from service provider server 120 for DLO platform 130. Such account services, account setup, authentication, electronic transaction processing, and other computing services of service applications 122 for DLO platform 130 may utilize decision services, such as for authentication, electronic transaction processing, risk analysis, fraud detection, and the other decision-making and data processing required by the aforementioned computing services. Decision services may correspond to main decision services used for decision-making using rules-based and/or AI models and engines. Various computing tasks of decision services may be utilized when processing data processing request 114 and other requests based on data loads, such as using loading analytic operations 132. Loading analytic operations 132 may utilize loading analytics 134 and storage cost parameters 136 with machine learning engines 138 in order to determine whether to store data loads for additional decision services. This may be based on different flows and/or storages of data, which may be determined from data, graphs, and/or accessible graph-based data (e.g., from one or more graph database queries) that may result in generating and/or making available a directed graph or other representation of the execution flows for decision services. Graphs may be DAGs or the like that may include representations of the nodes for computing tasks connected by edges for the different paths required for processing by decision services that result in an output or decision based on input data and/or requests.

In this regard, decision services may utilize machine learning engines 138 to interact with and detect computing task execution health and/or failures of computing tasks during runtime of decision services. Machine learning engines 138 and/or other rule computation or AI engines may be used by loading analytic operations 132 to determine, based on loading analytics 134 and storage cost parameters 136, whether storing a data load associated with data processing request 114 or other data processing request may be beneficial, efficient, and/or faster when utilized by multiple decision services during the computing task (e.g., based on the computing request). In some embodiments, machine learning engines 138 may include AI models, such as ML or neural network (NN) models. AI models may generally correspond to any artificial intelligence that performs decision-making, such as rules-based engines and the like. However, AI models may also include subcategories, including ML models and NN models that instead provide intelligent decision-making using algorithmic relationships. Generally, NN may include deep learning models and the like, and may correspond to a subset of ML models that attempt to mimic human thinking by utilizing an assortment of different algorithms to model data through different graphs of neurons, where neurons include nodes of data representations based on the algorithms that may be interconnected with different nodes. ML models may similarly utilize one or more of these mathematical models, and similarly generate layers and connected nodes between layers in a similar manner to neurons of NN models.

When building ML models for machine learning engines 138, training data may be used to generate one or more classifiers and provide recommendations, predictions, or other outputs based on those classifications and an ML model. The training data may be used to determine input features for training predictive scores for service level agreement (SLA) times, average or predicted data loading times, data loading requirements, data loading resource usage, data storage resource consumption and/or cost, and the like. For example, ML models for machine learning engines 138 may include one or more layers, including an input layer, a hidden layer, and an output layer having one or more nodes, however, different layers may also be utilized. For example, as many hidden layers as necessary or appropriate may be utilized. Each node within a layer is connected to a node within an adjacent layer, where a set of input values may be used to generate one or more output scores or classifications. Within the input layer, each node may correspond to a distinct attribute or input data type that is used to train ML models for machine learning engines 138.

Thereafter, the hidden layer may be trained with these attributes and corresponding weights using an ML algorithm, computation, and/or technique. For example, each of the nodes in the hidden layer generates a representation, which may include a mathematical ML computation (or algorithm) that produces a value based on the input values of the input nodes. The ML algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for the ML models for machine learning engines 138 that attempt to classify whether to store a data load for usage by multiple decision services utilized during processing of data processing request 114 by service applications 122. Thus, when ML models for machine learning engines 138 are used to perform a predictive analysis and output, the input may provide a corresponding output based on the classifications trained for ML models for machine learning engines 138.

ML models for machine learning engines 138 may be trained by using training data associated, as well as the aforementioned features for decision services, corresponding computing tasks, metadata, and/or execution flow graphs. By providing training data to train ML models for machine learning engines 138, the nodes in the hidden layer may be trained (adjusted) such that an optimal output (e.g., a classification) is produced in the output layer based on the training data. By continuously providing different sets of training data and penalizing ML models for machine learning engines 138 when the output of ML models for machine learning engines 138 is incorrect, ML models for machine learning engines 138 (and specifically, the representations of the nodes in the hidden layer) may be trained (adjusted) to improve its performance in data classification. Adjusting ML models for machine learning engines 138 may include adjusting the weights associated with each node in the hidden layer. Thus, the training data may be used as input/output data sets that allow for ML models for machine learning engines 138 to make classifications based on input attributes. The output classifications for an ML model trained for machine learning engines 138 may be classifications of likelihood, benefit, cost, or the like for storing or caching a data load so that the data load may be utilized by multiple decision services during processing of a data processing request or other data processing requirement.

Service applications 122 may correspond to one or more processes to execute modules and associated specialized hardware of service provider server 120 to process a transaction or provide another service to customers, merchants, and/or other end users and entities of service provider server 120. In this regard, service applications 122 may correspond to specialized hardware and/or software used by service provider server 120 to providing computing services to users, which may include electronic transaction processing and/or other computing services using accounts provided by service provider server 120. In some embodiments, service applications 122 may be used by users associated with client devices 110 to establish user and/or payment accounts, as well as digital wallets, which may be used to process transactions. In various embodiments, financial information may be stored with the accounts, such as account/card numbers and information that may enable payments, transfers, withdrawals, and/or deposits of funds. Digital tokens for the accounts/wallets may be used to send and process payments, for example, through one or more interfaces provided by service provider server 120. The digital accounts may be accessed and/or used through one or more instances of a web browser application and/or dedicated software application executed by client devices 110 and engage in computing services provided by service applications 122. Computing services of service applications 122 may also or instead correspond to messaging, social networking, media posting or sharing, microblogging, data browsing and searching, online shopping, and other services available through service provider server 120.

In various embodiments, service applications 122 may be desired in particular embodiments to provide features to service provider server 120. For example, service applications 122 may include security applications for implementing server-side security features, programmatic client applications for interfacing with appropriate application programming interfaces (APIs) over network 140, or other types of applications. Service applications 122 may contain software programs, executable by a processor, including a graphical user interface (GUI), configured to provide an interface to the user when accessing service provider server 120 via one or more of client devices 110, where the user or other users may interact with the GUI to view and communicate information more easily. In various embodiments, service applications 122 may include additional connection and/or communication applications, which may be utilized to communicate information to over network 140.

Additionally, service provider server 120 includes database 124. Database 124 may store various identifiers associated with client device 110. Database 124 may also store account data, including payment instruments and authentication credentials, as well as transaction processing histories and data for processed transactions. Database 124 may store financial information and tokenization data. Database 124 may further store data associated with loading analytics 134 and/or storage cost parameters, as well as those required by machine learning engines 138, such as past data loads 126. Past data loads may include data loads, data loading times, data loading requirements and costs, data storage costs, data storage requirements, and the like. Past data loads 126 and other similar data may be utilized for intelligent determination of data loading requirements and whether machine learning engines 138 may load and store data utilized by multiple decisions services.

In various embodiments, service provider server 120 includes at least one network interface component 128 adapted to communicate client device 110 and/or other devices and servers over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2:
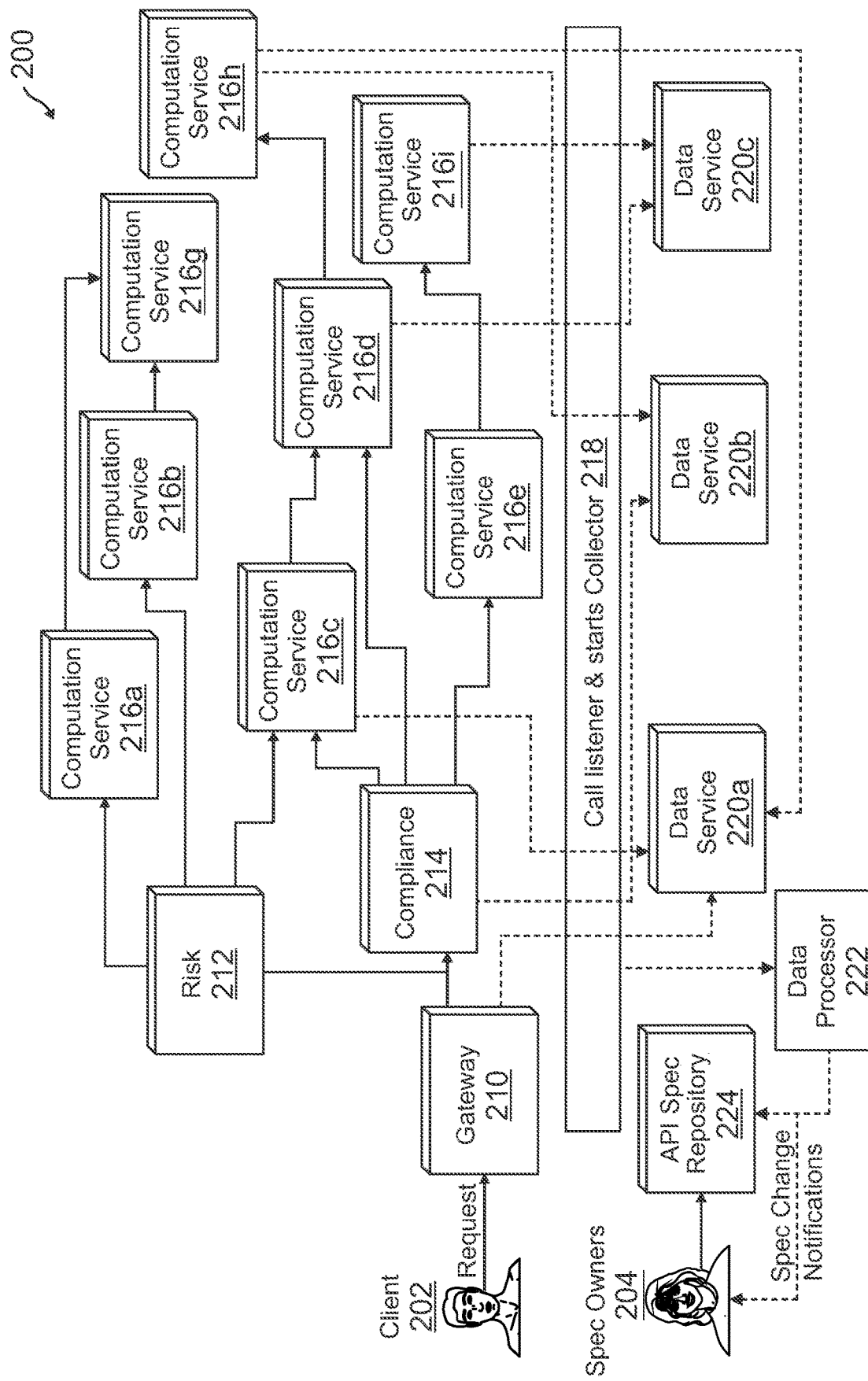
FIG. 2 is an exemplary system environment to determine data dependencies and intelligent data loading and preserving for different computing services in an N-layer computing architecture, according to various embodiments, according to an embodiment.

FIG. 2 is an exemplary system environment 200 to determine data dependencies and intelligent data loading and preserving for different computing services in an N-layer computing architecture, according to various embodiments. System environment 200 of FIG. 2 includes a gateway 210 for an intelligent data processor of data requests and data loads for decision devices, such as those utilizing machine learning engines 138 discussed in reference to system 100 of FIG. 1. In this regard, a client 202 utilizing a client device, such as client device 110 discussed in reference to system 100, may access gateway 210, which may process data managed by specification owners 204 for different API specifications.

In system environment 200, the client 202 initially requests data processing, such as by providing one or more data loads via a computing service that requires action from a service provider. A decision service corresponding to gateway 210 may be invoked in order to process a data processing request and provide a decision used when responding to the client device. In this regard, the decision service includes gateway 210 that may be responsible for service and/or task orchestrations and consolidation of task executions during runtime. For example, gateway 210 may use a direct graph or other representation of an execution flow having execution paths, where the execution paths include a flow or path of execution of one or more computing tasks in each execution flow. An intelligent data processor 222 further connects and communicates with a risk service 212 and a compliance service 214, which may serve to process data in order to provide an output and result to client 202 and/or another computing platform or device (e.g., a transaction processor). In this regard, risk service 212 and compliance service 214 may invoke computation decision services 216a-i based on a computation flow and/or graph, where each of computation decision services 216a-i require the same, similar, or different data loads based on requirements for data processing of the request. Each of computation decision services 216a-i may have different data computation statistics, requirements, SLAs, and the like that determine a computation time and/or requirement (e.g., resource usage, storage, etc.). SLAs and other requirements may also be utilized, accessed, and/or received from internal and/or external components where applicable. An SLA may indicate the required time to respond to a data processing request negotiated between the client device and the corresponding service provider associated with the decision service. In this regard, the SLA specifies a maximum amount of time negotiated between devices and/or servers for the required level of service that is provided.

Metadata for execution statistics may include current or historical information about the execution times and requirements of computation decision services 216a-i. Client 202 may provide a data processing request with a data load (e.g., authentication information, electronic transaction processing information, etc.), and a service provider may utilize one or more of computation decision services 216a-i for decision-making. The decision service(s) receive the data processing request, and gateway 210 is invoked to process the data. Gateway 210 may then interact with the data processing request in order to process such request and provide a decision or other output, such as one associated with electronic transaction processing, authentication, risk analysis, or the like. Thus, gateway 210 may interact with risk service and compliance service 214 that invoke other micro-services and/or decision services including computation decision services 216a-i. A flow of usage of computation decision services 216a-i may be determined using one or more computation graphs, such as DAGs or other directed graphs, that determine the flow of decisions and data to result in the corresponding decision or output. For example, computation decision service 216a may be invoked by risk service 212 and provide an output to computation decision service 216g, such as during a risk analysis that may utilize one or more risk rule and/or ML computation engines and/or models. Computation decision service 216b may also be invoked by risk service 212 that also provides data and/or utilizes computation decision service 216g. Computation decision service 216c may be invoked by both risk service 212 and compliance service 214 and/or utilize data from such services, and may flow to computation decision service 216d, and thereafter to computation decision service 216h. Compliance service 214 may also utilize computation decision service 216e and computation decision service 216i during a compliance check or other data processing.

In order to determine whether a data load may be reused and/or efficient for storage and later use by an additional one of computation decision services 216a-i, a call listener and collector 218 may be invoked by intelligent data processor 222 when data processing services 220a-c are utilized by computation decision services 216a-i. Intelligent data processor 222 may listen for data and events from call listener and collector 218, and thereafter may one or more computations of whether data storage and retention for data loads used between different ones of computation decision services 216a-i is valuable and/or may reduce computational requirements and resources. Operations and/or computations of intelligent data processor 222 for determination of such data retention are discussed in further detail with regard to FIG. 3 below.

Thereafter, intelligent data processor 222 may interact with an API specification repository 224 in order to identify API specifications and determine whether API specifications require updating and/or changing in order to request, retain, and/or identify retained data loads that may be used between computation decision services 216a-i. This may be done based on the determinations of whether data loads are valuable and/or more efficient to be stored during a data processing request by client 202 or another client/device when processed by one or more of computation decision services 216a-i. Such decisions may be based on algorithms and/or ML models, and specification owners 204 may be apprised or updated of API specification changes and updates by API specification repository 224 based on such changes. Thus, specification owners 204 may further update the APIs and/or prevent or change such updates based on the notifications.

Figure 3:
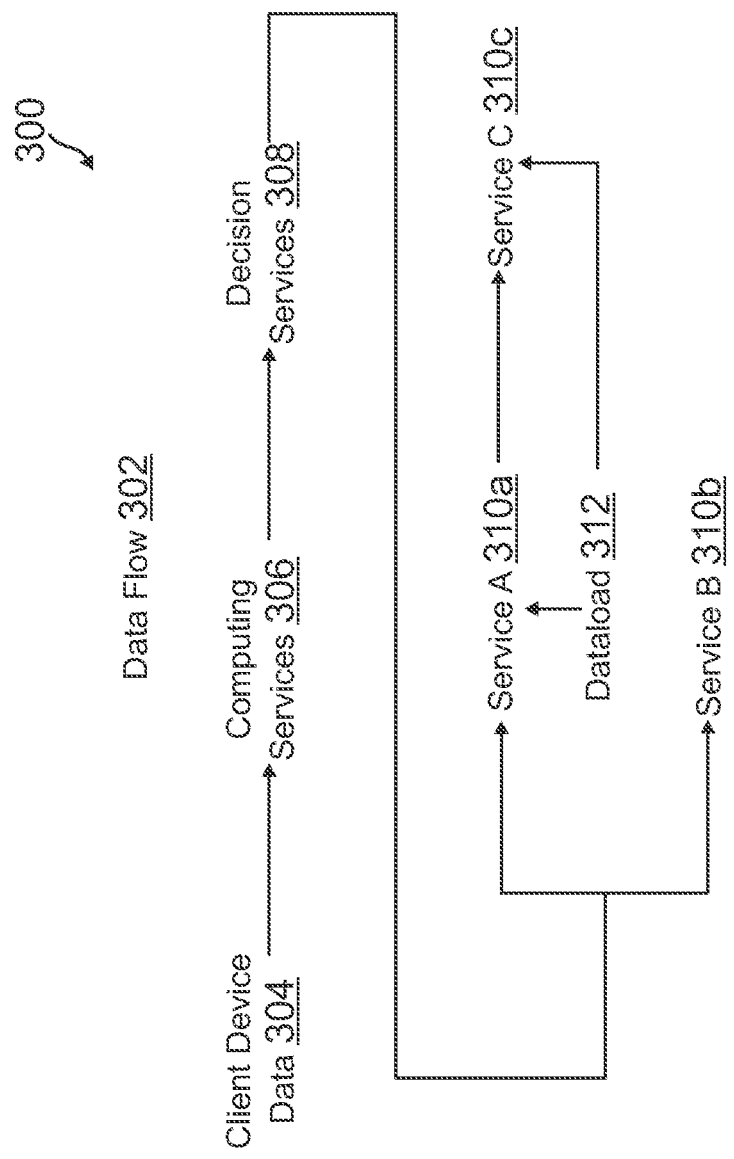
FIG. 3 is an exemplary diagram of flow of data for managing data dependencies in an N-layer architecture for data loading optimizations, according to an embodiment.

FIG. 3 is an exemplary diagram 300 of flow of data for managing data dependencies in an N-layer architecture for data loading optimizations, according to an embodiment. Diagram 300 includes a directed graph for an execution flow, such as one for a corresponding set of decision services discussed in reference to system 100 of FIG. 1. Diagram 300 may correspond to an execution flow of a decision service of service provider server 120 that dynamically determines whether to retain data and/or update API specifications for data flow based on data that may be re-used and/or coordinated for usage between multiple ones of the decision services.

In diagram 300, a data flow 302 corresponding to data and execution flows and/or pathways between different decisions services may be seen. For example, data flow 302 may correspond to a data processing request for client device data 304 that may be provided to computing services 306. Computing services 306 may invoke decision services 310a-c, where a data load 312 (e.g., a data load for authentication, risk analysis, login, etc.) may be shared between decision service 310a and decision service 310c. In order to determine whether caching and/or storing of data load 312 may be more efficient and/or require less computational resources, the intelligent data processor of the service provider may utilize one or more processing operations and/or analytics in order to determine whether the data storage and/or sharing between data services may be beneficial.

In this regard, the intelligent data processor may perform a computation of statistics over a period of time to determine if updating of API specification(s) is/are necessary and/or whether data should be stored, cached, and/or shared between multiple decision services invoked during one or more data processing requests. The intelligent data processor may perform a computation on collected data specifications for the decision services and/or data processing requests. Thereafter, the intelligent data processor may analyze an API specification from a starting point, such as when data is loaded, to another point in the API specification and/or directed graph of decision service usage to determine when and/or where the data load may be utilized. If so, code may be injected, updated, or changed with API specifications in order to access, share, and/or store the data load between different API specifications of decision service A 310a and decision service C 310c. The new code may be used to stop data loading by the other API and/or decision service, and may be provided to one or more developers of the API specifications in order for approval. Approval may be conditional on the developer approving or may be automatic based on analysis of the code and determination to update the API specification and/or share data load 312.

In order to determine whether data loads may be optimized, such as between decision service A 310a and decision service C 310c, a computational algorithm and/or ML model may be utilized. For example, equations may be as follows for determination of whether data may be stored and/or shared:

$$O(fx) = Txn, DPS(n, Rq, Rs) \qquad \text{Equations 1}$$

O(fx)=An optimization needed in a specific data processing flow path

Figure 4:
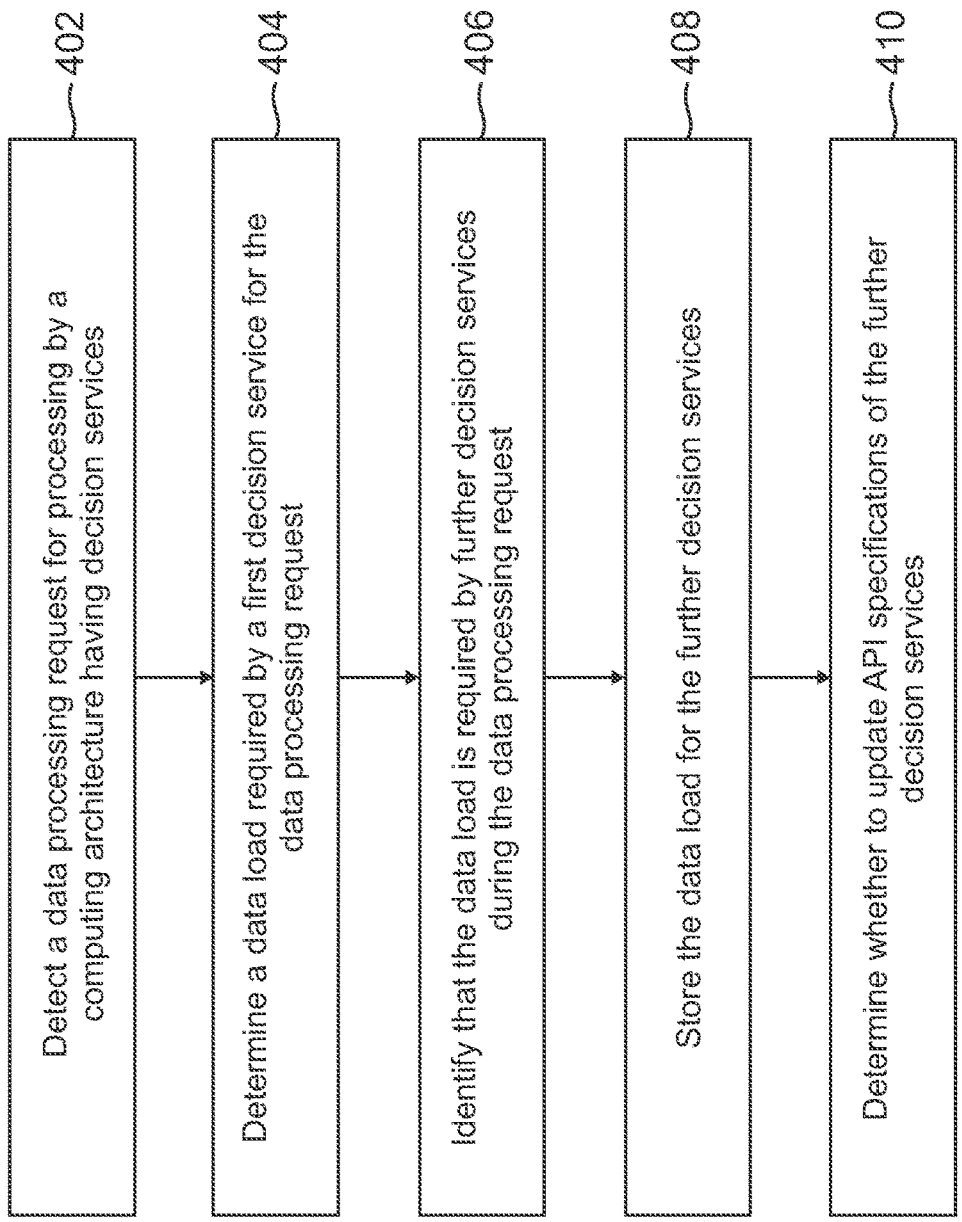
FIG. 4 is a flowchart of an exemplary process for managing data dependencies in an N-layer architecture for data loading optimizations, according to an embodiment.

Txn=Data transaction metadata that may be needed to ensure all details are part of same transactions n=Number of times a specific data process service is called Rq=Requested data independent of all requests made Rs=Responsive data independent of all responses given Thereafter:

If O(fx)>X where X is a defined comparable value, then:

O(dps)=w0*Td, w1*(min & max path length between 2 calls), N, where:

O(dps)=A change beneficial for a data process service in a specific transaction flow path N=Number of loads occurring in a specific transaction flow path Td=Time taken for a processing request by the decision service/SLA w0, w1=Weighted numbers to determine the cost on the time and length If O(dps)>Y where Y is a defined comparable value that also represents the cost of propagating the loaded data between decision services, then, the data load may be propagated and/or API specifications modified based on: cost (c1+c2)/cost (c1+data prop S(c1) to S(c2))>Y FIG. 4 is a flowchart 400 of an exemplary process for managing data dependencies in an N-layer architecture for data loading optimizations, according to an embodiment. Note that one or more steps, processes, and methods described herein of flowchart 400 may be omitted, performed in a different sequence, or combined as desired or appropriate.

At step 402 of flowchart 400, a data processing request that is for processing by a computing architecture having decision services is detected. The data processing request may come in through a gateway and may be requested for processing by one or more data services of the computing architecture, such as a service provider. The computing architecture may use decision services, such as microservices, that process the same, similar, and/or different data loads that may incorporate the same, similar, or different data (e.g., an account credential, financial data, personal data, etc.) in order to provide an output and computational decision. At step 404, a data load required by a first decision service for the data processing request is determined, such as based on the data loads associated with the data processing request. The data load may be provided during the data processing request or may be accessed based on identifiers, data, and/or requests for data from the data processing request.

At step 406, it is identified that the data load is required by further decision services during the data processing request. For example, a computational analysis and/or ML or other AI model may be used to determine benefits and/or costs from collected statistics on storing the data for use by further decision services. If a computation of such data sharing and/or storage may be beneficial, an intelligent data processor may fetch the API specifications, create data specifications for available data, and/or modify the API specifications accordingly for the first decision service through the last service in the data processing and/or data transaction flow.

At step 408, the data load is stored for the further decision services. The data may be cached and/or stored so that later decision services invoking the data load may use the data without doing or performing an actual load of the data. Further, at step 410, it is determined whether to update API specifications of the further decision services. This may include pushing the modified API specification to the specification repository to be next consumed by the decision service(s), During these operations, the system may continue analyzing and/or making changes to accommodate any new decision service additions or API call change requirements. Thus, the operation may continue monitoring for any changes in the N-layer architecture to ensure that it is in an optimal mode for data efficiency and storage.

Figure 5:
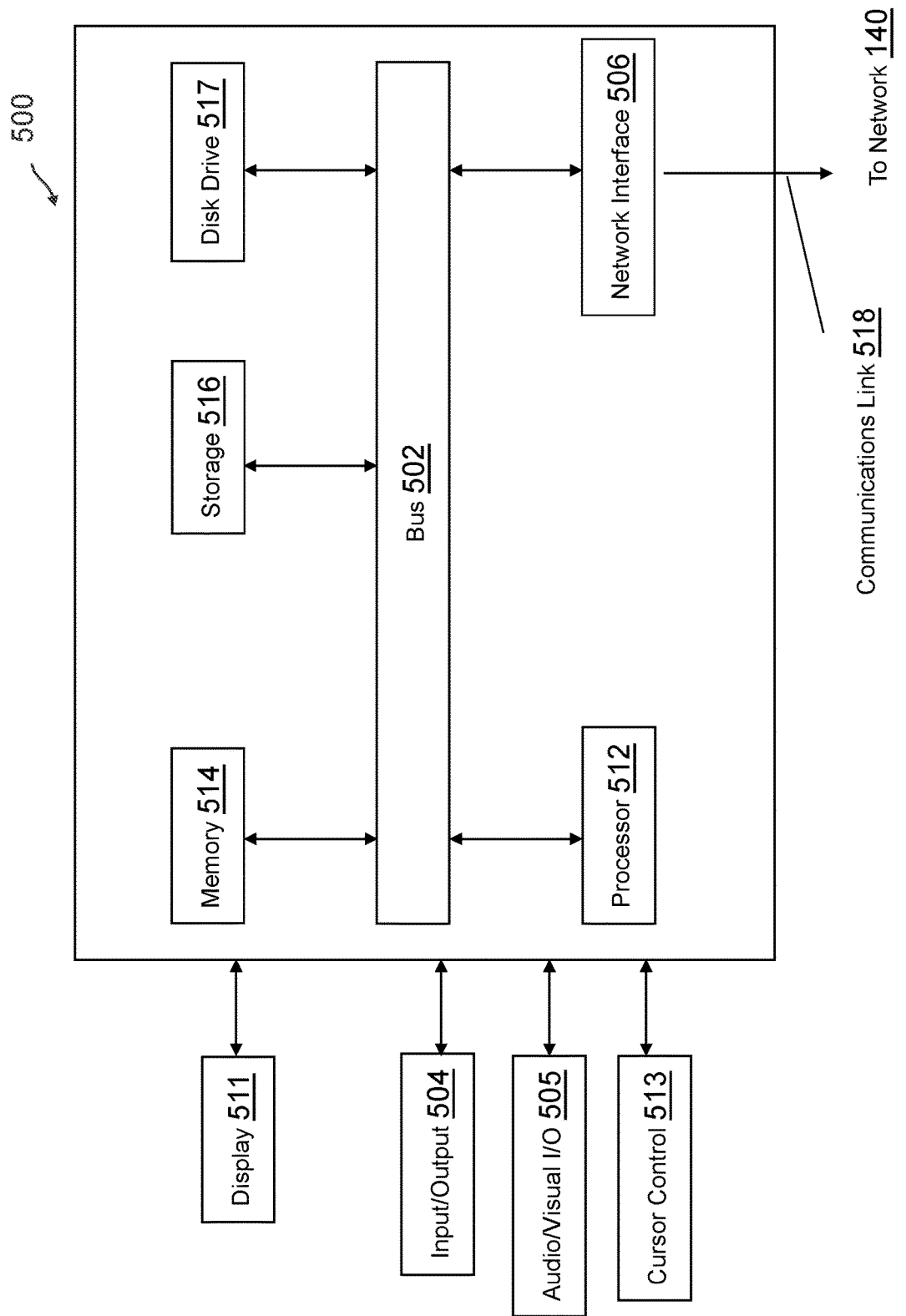
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
    a non-transitory memory; and
    one or more hardware processors coupled to the non-transitory memory and configured to read instructions from the non-transitory memory to cause the system to perform operations comprising:
        executing a call listener for application programming interface (API) calls of a computing architecture of a service provider associated with the system;
        receiving, via the call listener, a data processing request for the computing architecture;
        identifying a data loading operation for processing a data load by a first API of a first decision service of the computing architecture for the data processing request;
        determining at least one additional data loading operation for processing the data load by at least one second API of at least one second decision service of the computing architecture for the data processing request;
        determining that a storage of the data load for the at least one second decision service meets a threshold burden for the storage by the system; and
        saving the data load for the at least one second API based on the determining that the storage of the data load meets the threshold burden.

2. The system of claim 1, wherein the operations further comprise:
    loading the data load to the at least one second decision service at a later time from the saved data load based on the at least one second API.

3. The system of claim 2, wherein the data load is saved to a short-term cache and loaded faster than a data call is processed for the data load from a permanent storage of the data load.

4. The system of claim 1, wherein the threshold burden comprises a number of future uses of the data load by the computing architecture during processing of the data processing request or one or more matching data processing requests.

5. The system of claim 1, wherein the operations further comprise:
    monitoring, via the call listener, a plurality of usages of the data load from the saving for the at least one second API;
    updating at least one API specification based on the monitoring; and
    notifying one of an owner or an administrator associated with the at least one API specification based on the updating.

6. The system of claim 1, wherein the determining that the storage of the data load meets the threshold burden is performed by an intelligent data processor utilizing a ML engine trained based on at least one of past data loads or directed graphs for processing of decision services for the computing architecture.

7. The system of claim 6, wherein operations further comprise:
    training the ML engine for at least the threshold burden based on a time to obtain the past data load by each of the decision services and a data processing cost to the computing architecture of the past data loads.

8. The system of claim 6, wherein the threshold burden comprises a minimum threshold number of usages of the data load by the first decision service and the at least one second decision service when processing the data processing request.

9. The system of claim 1, wherein the first decision service and the at least one second decision service are associated with at least one of a login operation, an authentication operation, an electronic transaction processing, a risk analysis, or a fraud detection.

10. A method comprising:
    determining a first data loading operation of a first application programming interface (API) for for processing a data load of a data processing request, wherein the first API is associated with a first decision service of a computing architecture;
    identifying a plurality of second data loading operations of a plurality of second APIs for processing the data load, wherein the plurality of second APIs are associated with a plurality of second decision services of the computing architecture;
    processing, using an artificial intelligence (AI) engine, parameters for storage of the data load for passing of the data load to the plurality of second data loading operations after loading of the data load by the first API for the first data loading operation;
    determining, based on the processing, that a storage of the data load for the plurality of second decision services meets a data storage cost threshold; and
    storing the data load in a data cache based on the determining that the storage of the data load meets the data storage cost threshold.

11. The method of claim 10, further comprising:
    in response to determining that the storage of the data load meets the data storage cost threshold, updating an API specification of each of the plurality of second APIs, wherein the updated API specifications each include an operation to request the data load from the data cache during future data loading operations, and wherein the updated API specifications each propagate the data load from at least one of the first API or the plurality of second APIs; and
    propagating the updated API specifications with at least the first API and the plurality of second APIs.

12. The method of claim 11, wherein prior to the updating, the method further comprises:
    analyzing the API specifications, service layer agreements (SLAs), and a number of times that the data load is passed through the plurality of second decision services, wherein the updating is performed based on the analyzing.

13. The method of claim 10, further comprising:
passing the data load between at least one of the plurality of second decision services based on a corresponding at least one of the plurality of second APIs from the data cache.

14. The method of claim 10, wherein each of the parameters is associated with a corresponding weight that is based on and adjusted by a number of usages by the data load from the first decision service and the plurality of second decision services and a data retrieval cost of data calls for the data load from a data storage.

15. The method of claim 14, wherein the AI engine comprises at least one machine learning (ML) model trained using prior data calls by the first decision service and the plurality of second decision services.

16. The method of claim 14, wherein the corresponding weights are further based on a minimum length of time and a maximum length of time between the data calls by the first decision service and the plurality of second decision services when responding to data processing requests.

17. A non-transitory machine-readable medium having stored thereon machine-readable instructions executable to cause a machine to perform operations comprising:
determining, via an application programming interface (API) call listener, that a data load by a first decision service is required by a second decision service and meets a data storage cost;
storing the data load for the second decision service in a short-term memory;
receiving, via the API call listener, an API call for the data load from an API of the second decision service; and
loading the data load to the second decision service based on the API call from the API.

18. The non-transitory machine-readable medium of claim 17, wherein prior to the determining, the operations further comprise:
determining, based on the API call listener, that the data load is required for a threshold number of usages by the first decision service, the second decision service, or a plurality of additional decision services.

19. The non-transitory machine-readable medium of claim 18, wherein the threshold number of usages are determined based on monitoring, over a period of time, a data retrieval cost to call for the data load from a data storage.

20. The non-transitory machine-readable medium of claim 17, wherein the operations further comprise:
updating an API specification for the API based on the storing and the loading; and
notifying at least one computing device associated with the API based on the updating.

* * * * *